United States Patent
Samples et al.

(10) Patent No.: US 12,398,313 B2
(45) Date of Patent: Aug. 26, 2025

(54) IONIC LIQUID CHAIN TRANSFER AGENT AS WELL TREATMENT ADDITIVE

(71) Applicant: Halliburton Energy Services, Inc., Houston, TX (US)

(72) Inventors: Evan Samples, Houston, TX (US); Ronald Bosch, Houston, TX (US); Denise Nicole Benoit, Houston, TX (US); Antonio Recio, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/091,232

(22) Filed: Dec. 29, 2022

(65) Prior Publication Data
US 2024/0228861 A1    Jul. 11, 2024

(51) Int. Cl.
*C09K 8/60*   (2006.01)
*C08F 120/60* (2006.01)
*E21B 43/16*  (2006.01)

(52) U.S. Cl.
CPC ............ *C09K 8/608* (2013.01); *C08F 120/60* (2013.01); *E21B 43/16* (2013.01); *C09K 2208/12* (2013.01)

(58) Field of Classification Search
CPC ..... C09K 8/608; C09K 2208/12; E21B 43/16; C08F 120/60
See application file for complete search history.

(56) References Cited

U.S. PATENT DOCUMENTS

| 6,608,005 B2 * | 8/2003 | Palmer ............... C09K 8/32 507/261 |
| 9,702,219 B2 * | 7/2017 | Stanciu ............... E21B 43/267 |

(Continued)

FOREIGN PATENT DOCUMENTS

| CA | 2951371 | 1/2016 |
| CA | 3105166 | 2/2020 |

(Continued)

OTHER PUBLICATIONS

Tadeusz Biedroń; Przemyslaw Kubisa (2007). Chain transfer to ionic liquid in an anionic polymerization of methyl methacrylate. , 45(17), 4168-4172.

(Continued)

*Primary Examiner* — Angela M DiTrani Leff
(74) *Attorney, Agent, or Firm* — Thomas Rooney; C. Tumey Law Group PLLC

(57) ABSTRACT

Well treatment fluids comprise well treatment additives comprising an ionic liquid. Method of treating a subterranean formation may comprise contacting the subterranean formation with the well treatment additive, wherein the well treatment additive comprises an ionic liquid comprising a cation and an anion having the following formula: $[R_1R_2R_3R_4N]^+[X]^-$, wherein $R_1$, $R_2$, $R_3$, $R_4$ are individually selected from the group consisting of an alkyl group, a hydroxyalkyl group, and a combination thereof provided that at least one of $R_1$, $R_2$, $R_3$, $R_4$ is the hydroxyalkyl group, and wherein the anion $X^-$ comprises at least one anion selected from the group consisting of $F^-$, $Cl^-$, $Br^-$, $I^-$, $H_2PO_4^-$, $HPO_4^{2-}$, $PO_4^{3-}$, $HSO_4^-$, $C_7H_7OSO_3^-$, $C_7H_7SO_3^-$, $SO_4^{2-}$, $CH_3SO_3^-$, $C_2H_5SO_3^-$, $CH_3OSO_3^-$, $C_2H_5OSO_3^-$, and combinations thereof.

7 Claims, 5 Drawing Sheets

(56) References Cited

U.S. PATENT DOCUMENTS

| | | | |
|---|---|---|---|
| 10,072,203 B2 | 9/2018 | Chen et al. | |
| 10,087,384 B2 | 10/2018 | Reid et al. | |
| 10,351,760 B2 * | 7/2019 | Schultheiss | C09K 8/035 |
| 10,844,263 B2 * | 11/2020 | Aston | C09K 8/035 |
| 10,988,657 B2 | 4/2021 | Shumway et al. | |
| 11,124,692 B2 * | 9/2021 | Weers | C09K 8/524 |
| 11,254,881 B2 * | 2/2022 | Weers | C10G 31/08 |
| 11,485,915 B2 | 11/2022 | Weers et al. | |
| 2007/0254822 A1 | 11/2007 | Szarvas et al. | |
| 2009/0029880 A1 * | 1/2009 | Berry | C09K 8/86 |
| | | | 507/243 |
| 2014/0378638 A1 | 12/2014 | Wang | |
| 2015/0047849 A1 * | 2/2015 | Wicker, Jr. | C09K 8/80 |
| | | | 166/308.2 |
| 2017/0145282 A1 | 5/2017 | Shumway et al. | |
| 2019/0051326 A1 | 2/2019 | Kondo et al. | |
| 2021/0155846 A1 | 5/2021 | Xu et al. | |

FOREIGN PATENT DOCUMENTS

| | | |
|---|---|---|
| CN | 104402742 | 3/2015 |
| CN | 104497994 | 4/2015 |
| CN | 104498960 | 4/2015 |
| CN | 103320797 | 8/2015 |
| CN | 109987723 | 7/2019 |
| CN | 209797599 | 12/2019 |
| CN | 111826244 | 10/2020 |
| CN | 111875504 | 11/2020 |
| CN | 111892499 | 11/2020 |
| CN | 111908626 | 11/2020 |
| CN | 112093918 | 12/2020 |
| CN | 112777758 | 5/2021 |
| EP | 3820961 | 5/2021 |
| GB | 2433951 | 7/2007 |
| GB | 2444614 A | 6/2008 |
| JP | 5717112 | 3/2015 |
| WO | 2014098871 A2 | 6/2014 |
| WO | 2016010520 | 1/2016 |

OTHER PUBLICATIONS

Macromolecules, One-Pot Synthesis of Ion-Containing CO2-Based Polycarbonates Using Protic Ionic Liquids as Chain Transfer Agents, Huang, et al., American Chemical Society, 2018.

Journal of Polymer Science: Part A: Polymer Chemistry, 2007, 45, 4168 & 4172.

Rosen, Mark A. et al. "Carbon-11 Choline: Synthesis, Purification, and Brain Uptake Inhibition by 2-Dimethylaminoethanol." The Journal of Nuclear Medicine, vol. 26, No. 12, Dec. 1985, pp. 1424-1428, p. 1424. PDF file. 5 pages.

Earl, Gary W. et al. "Quaternary Methyl Carbonates: Novel Agents For Fabric Conditioning." Journal of Surfactants and Detergents, vol. 8, No. 4, Oct. 2005, pp. 325-329, p. 325; scheme 1. PDF file. 5 pages.

International Search Report and Written Opinion for International Patent Application No. PCT/US2023/027223 dated Oct. 17, 2023. PDF file. 13 pages.

Quaternary Ammonium Salts, Chemicke Listy, Mar. 2017, pp. 197-205 (Year: 2017).

* cited by examiner

IONIC LIQUID CHAIN TRANSFER AGENT AS WELL TREATMENT ADDITIVE

BACKGROUND

A natural resource such as oil or gas residing in a subterranean formation can be recovered by drilling a wellbore into the formation. A wellbore is typically drilled while circulating a drilling fluid through the wellbore. The various functions of a drilling fluid include removing drill cuttings from the wellbore, cooling and lubricating the drill bit, aiding in support of the drill pipe and drill bit, and providing a hydrostatic head to maintain the integrity of the wellbore walls and preventing well blowouts. However, the porosity and permeability of the formation determine its ability to store hydrocarbons, and the facility with which the hydrocarbons can be extracted from the formation. Zones that comprise shales and/or reactive clays can become unstable when they are in contact with water in a drilling fluid. These zones contain clays that have been dehydrated over geologic time by overburden pressure. When these zones are exposed to water contained in a drilling fluid, a well-treatment fluid or produced water, the clays osmotically imbibe water and swell. Swelling clays can be a major mechanism of formation damage due to loss of mobility of hydrocarbon fluids in the formation. The swelling can cause portions of the clay and adjacent fines to become mobile within the production stream and, too frequently, encounter constrictions in capillaries, where they can bridge off the capillaries and severely diminish the flow rate of hydrocarbons to the wellbore. Sometimes the loss of permeability observed is due to clay swelling without migration, but often clay swelling is accompanied by migration of clay and other fines. Non-swelling clays may also respond to foreign water and begin to migrate.

Shale is a fine-grained, fissile, detrital sedimentary rock formed by consolidation of clay- and silt-sized particles into thin, relatively impermeable layers. Some shales encountered during subterranean operations can be sensitive to water, due in part to clay content and the ionic composition of the clay. Such shales, also known as heaving or sloughing shales, can have a tendency to degrade, such as swell or crack, upon contact with various downhole fluids, such as drilling fluids and well treatment fluids. The complications associated with shale degradation during drilling may substantially increase the time and cost of drilling. The degradation of shales in a borehole can render the borehole walls unstable. The heaving shale material can slough and cave into the borehole. Degradation of the shale can interrupt circulation of the drilling fluid and cause greater friction between the drill string and the wellbore. Sloughing of shale material into the borehole can cause the drill stem to become stuck and can enlarge the borehole, with the result that large subterranean cavities are formed. The degradation of the shale may interfere with attempts to maintain the integrity of drilled cuttings traveling up the well bore until such time as the cuttings can be removed by solids control equipment located at the surface. Degradation of drilled cuttings prior to their removal at the surface may prolong drilling time because shale particles traveling up the well bore can break up into smaller and smaller particles, which can expose new surface area of the shale particles to the drilling fluid and lead to further absorption of water and degradation. Where sloughing occurs while the drilling bit is being changed at the surface, the borehole fills up and must be cleared before drilling can proceed. The heaving shale material taken up into the drilling fluid can adversely affect the viscosity characteristics of the drilling fluid to the point where the fluid must be chemically treated to reduce the viscosity thereof or it must be diluted followed by the addition of weighing material to maintain a given mud weight.

Finally, wellbore fluids change over time. For example, water stream can lead to scale formation and impurity build-up.

BRIEF DESCRIPTION OF THE DRAWINGS

These drawings illustrate certain aspects of some of the embodiments of the present disclosure and should not be used to limit or define the disclosure.

DESCRIPTION

Figure 1:
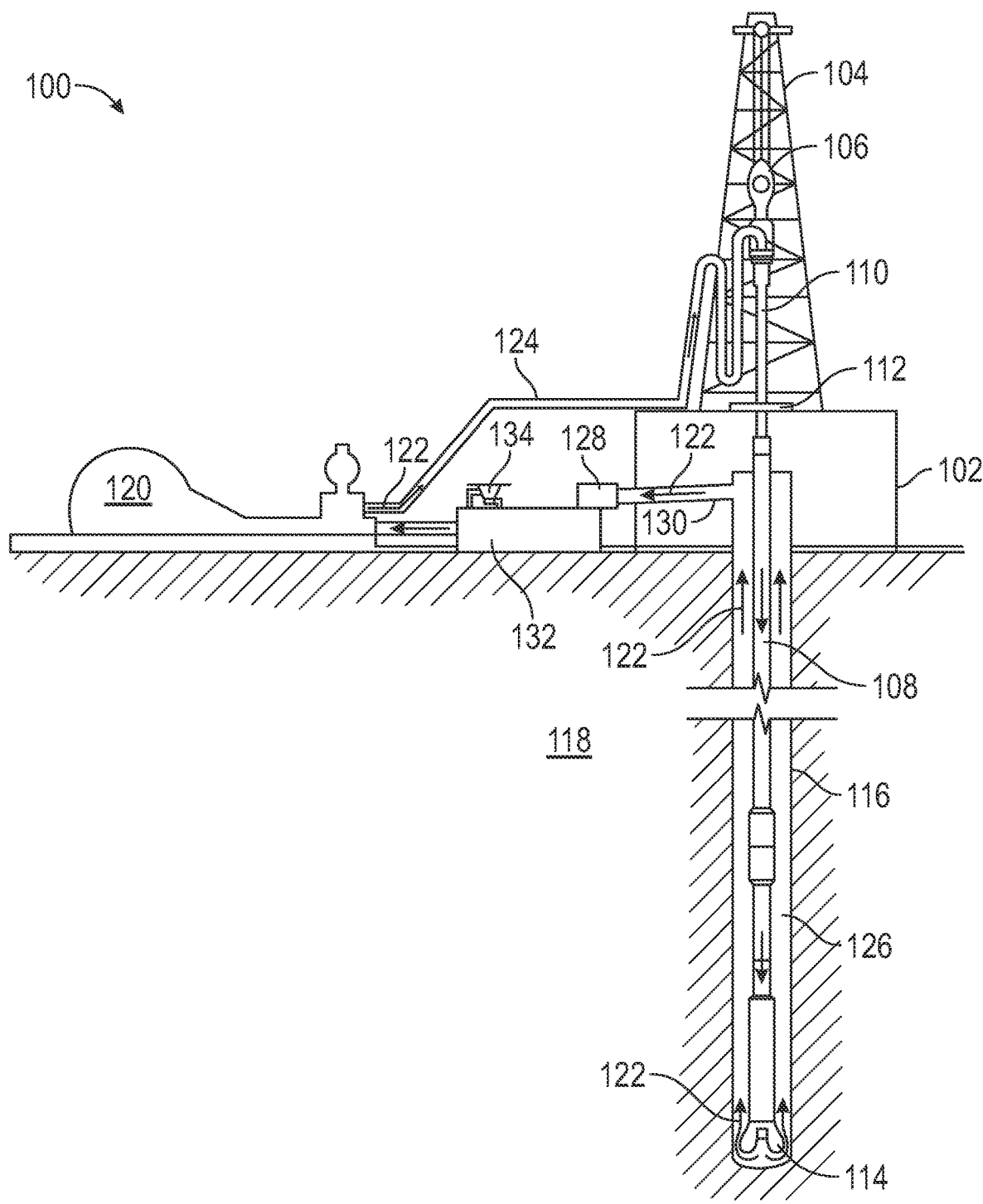
FIG. 1 illustrates a drilling assembly, in accordance with some embodiments of the present disclosure.

Disclosed herein are well treatment additives and, more particularly, disclosed are well treatment additives comprising an ionic liquid. In one or more embodiments, the ionic liquid is dual functional for well treatment and as a chain transfer agent to limit molecular weight during polymerization of ionic monomers. For example, the ionic liquid can be used during polymerization of ionic monomers to limit the molecular weight of the ionic polymer. In addition, the ionic liquid enhances the ionic polymer ability to perform as a well treatment additive. In one or more embodiments, the well treatment additive may act as a clay stabilizer, shale stabilizer, salt control, and/or scale inhibitor. Finally, the ionic liquid acts as a well treatment additive on its own. In some embodiments, a well treatment additive comprises an ionic liquid, an ionic polymer, and a solvent.

Various embodiments of the present disclosure provide certain advantages over other methods, compositions, and systems for clay stabilization. In various embodiments, the well treatment additives can stabilize or inhibit clay or shale disaggregation more effectively than other clay or shale inhibitors. In various embodiments, the presence of at least one substituted amine in the well treatment additives makes it a stronger base than other well treatment additives (e.g., aminohydrocarbylenoxy or aminopoly(hydrocarbylenoxy) that lack at least one substituted amine, allowing it to be more easily protonated to form an ion that can provide shale stabilization. In various embodiments, the presence of at least one ammonium group in the well treatment additives makes the well treatment additives more effective for clay stabilization than other clay stabilizers. In various embodiments, the N-substituted amide groups and the hydroxyalkyl ammonium terminal group on the shale stabilizer each provide shale stabilization, providing overall greater clay and shale stabilization than a molecule including only one of these structural attributes. Further, the well treatment additive comprising an ionic liquid allows for salt and/or scale control.

Ionic Liquid

The ionic liquid is a compound that comprises a cation and an anion. The compound is ionic and is referred to as a liquid because it is liquid at standard conditions (i.e., 20° C. and 101 kPa). The cation comprises a quaternary ammonium having at least one hydroxyalkyl group. The ionic liquid has a general formula $[R_1R_2R_3R_4N]^+[X]^-$, wherein $R_1$, $R_2$, $R_3$, $R_4$ are individually selected from the group consisting of an alkyl group, a hydroxyalkyl group, and a combination thereof provided that at least one of $R_1$, $R_2$, $R_3$, $R_4$ is the hydroxyalkyl group, and wherein the anion $X^-$ comprises at least one selected from the group consisting of $F^-$, $Cl^-$, $Br^-$, $I^-$, $H_2PO_4^-$, $HPO_4^{2-}$, $PO_4^{3-}$, $HSO_4^-$, $C_7H_7OSO_3^-$, $C_7H_7SO_3^-$, $SO_4^{2-}$, $CH_3SO_3^-$, $C_2H_5SO_3^-$, $CH_3OSO_3^-$, $C_2H_5OSO_3^-$, and combinations thereof. In one or more embodiments, the cation of the ionic liquid is selected from the group represented below:

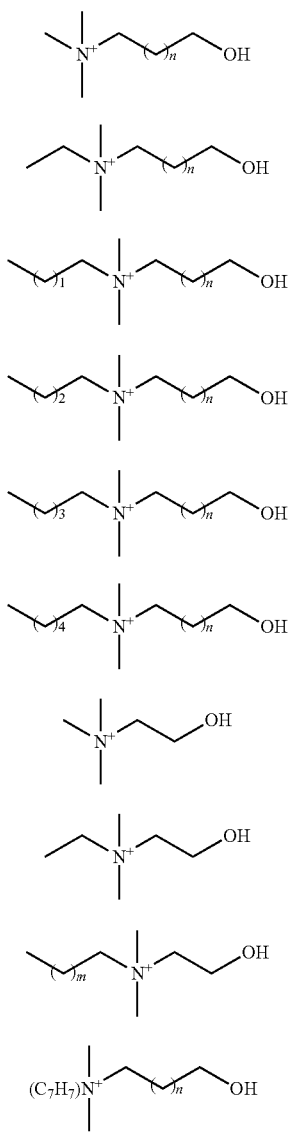

Structure 1

Structure 2

Structure 3

Structure 4

Structure 5

Structure 6

Structure 7

Structure 8

Structure 9

Structure 10

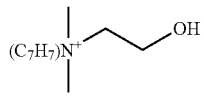

Structure 11 where n and m are integers from 1 to 10.

In one or more embodiments, structure 8 is associated with ethyl sulphate ($C_2H_5SO_4^-$).

The ionic liquid can be prepared in any suitable way. In some embodiments, the ionic liquid can be synthesized by mixing a reactant, which has a tertiary amine with a primary alcohol group, with an alkyl sulfate. In one or more embodiments, the reactant can be any N-dialkyl-N-hydroxyalkyl amine comprising any suitable alkyl and primary alcohol. The reactant, which is a tertiary amine with a primary alcohol group, can include N-dimethylethanolamine, N-diethylethanolamine, N-methyl-N-propyl ethanolamine, N-methyl-N-butyl ethanolamine, N-methyl-N-pentyl ethanolamine, N-methyl-N-hexyl ethanolamine, N-methyl-N-heptyl ethanolamine, N-dimethyl propanolamine, N-methyl-N-ethyl propanolamine, N-dimethyl butanol amine, N-methyl-N-ethyl butanol amine. In one or more embodiments, the ionic liquid is combined with a solvent or includes a solvent, such as silicones, organic compounds, water, alcohols, and supercritical fluids.

The product of the reaction is the ionic liquid of one or more embodiments of the present disclosure. The cation of the ionic liquid of one or more embodiments of the present disclosure may be a quaternary ammonium having at least one hydroxyalkyl group. The quaternary ammonium having at least one hydroxyalkyl group may be a N-trialkyl-N-hydroxyalkyl ammonium or N-dialkyl-N-dihydroxyalkyl ammonium. Examples of suitable N-trialkyl alcohol ammonium include (2-hydroxyethyl) trimethylammonium, (3-hydroxypropyl) trimethylammonium, (4-hydroxybutyl) trimethylammonium, (5-hydroxypentyl) trimethylammonium, (6-hydroxyhexyl) trimethylammonium, (6-hydroxyhexyl) trimethylammonium, (7-hydroxyheptyl) trimethylammonium, ethyl (2-hyoxyethyl) dimethylammonium, ethyl (2-hydroxyethyl) dimethylammonium, ethyl (3-hydroxypropyl) dimethylammonium, ethyl (4-hydroxybutyl) dimethylammonium, ethyl (5-hydroxypentyl) dimethylammonium, ethyl (6-hydroxyhexyl) dimethylammonium, ethyl (6-hydroxyhexyl) dimethylammonium, ethyl (7-hydroxyheptyl) dimethylammonium, propyl (2-hyoxyethyl) dimethylammonium, propyl (2-hydroxyethyl) dimethylammonium, propyl (3-hydroxypropyl) dimethylammonium, propyl (4-hydroxybutyl) dimethylammonium, propyl (5-hydroxypentyl) dimethylammonium, propyl (6-hydroxyhexyl) dimethylammonium, propyl (6-hydroxyhexyl) dimethylammonium, propyl (7-hydroxyheptyl) dimethylammonium, butyl (2-hyoxyethyl) dimethylammonium, butyl (2-hydroxyethyl) dimethylammonium, butyl (3-hydroxypropyl) dimethylammonium, butyl (4-hydroxybutyl) dimethylammonium, butyl (5-hydroxypentyl) dimethylammonium, butyl (6-hydroxyhexyl) dimethylammonium, butyl (6-hydroxyhexyl) dimethylammonium, butyl (7-hydroxyheptyl) dimethylammonium, pentyl (2-hyoxyethyl) dimethylammonium, pentyl (2-hydroxyethyl) dimethylammonium, pentyl (3-hydroxypropyl) dimethylammonium, pentyl (4-hydroxybutyl) dimethylammonium, pentyl (5-hydroxypentyl) dimethylammonium, pentyl (6-hydroxyhexyl) dimethylammonium, pentyl (6-hydroxyhexyl) dimethylammonium, pentyl (7-hydroxyheptyl) dimethylammonium, hexyl (2-hyoxyethyl) dimethylammonium, hexyl (2-hydroxyethyl) dimethylammonium, hexyl (3-hydroxypropyl) dimethylammonium, hexyl (4-hydroxybutyl) dimethylammonium, hexyl (5-hydroxypentyl) dimethylammonium, hexyl (6-hydroxyhexyl) dimethylammonium, hexyl (6-hydroxyhexyl) dimethylammonium, hexyl (7-hydroxyheptyl) dimethylammonium, heptyl (2-hyoxyethyl) dimethylammonium, heptyl (2-hydroxyethyl) dimethylammonium, heptyl (3-hydroxypropyl) dimethylammonium, heptyl (4-hydroxybutyl) dimethylammonium, heptyl (5-hydroxypentyl) dimethylammonium, heptyl (6-hydroxyhexyl) dimethylammonium, heptyl (6-hydroxyhexyl) dimethylammonium, heptyl (7-hydroxyheptyl) dimethylammonium.

Examples of suitable alkyl sulfates include diethyl sulfate and dimethyl sulfate. Example of a trialkyl amine is dimethyl ethanol amine (DMEA).

In one or more embodiments, the ionic liquid is a hydroxyalkyl ammonium sulfate. One example of a suitable ionic liquid is ethyl (2-hydroxyethyl) dimethylammonium ethyl sulfate. For example, ethyl (2-hydroxyethyl) dimethylammonium ethyl sulfate is synthesized by adding in a controlled manner diethyl sulfate (DES) to 2-dimethyl ethanolamine (DMEA) at 0° C. as follows:

Reaction 1

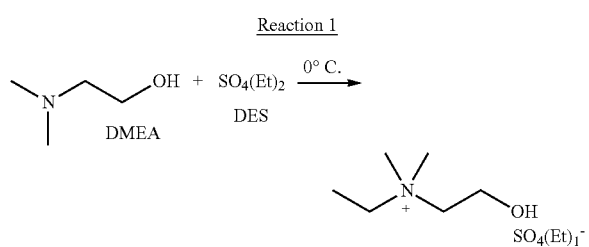

The product ethyl (2-hydroxyethyl) dimethylammonium ethyl sulfate is a pure and shelf stable liquid.

The ionic liquid can be used for a number of functions. For example, the ionic liquid can be used during polymerization of ionic monomers. During polymerization, the ionic liquid functions as a chain transfer agent to control the chain growth and molecular weight of the ionic polymers for improved clay control activity, shale control activity, scale control activity, and/or salt control activity. The utility of the ionic liquid is two-fold: 1) the ionic liquid enhances the polymer ability to perform as a well treatment additives such as clay stabilizer, shale stabilizer, salt control, and/or scale inhibitor and 2) the ionic liquid serves as a chain transfer agent (CTA) to control the molecular weight of the ionic polymer during one of the radical polymerization mechanisms. Even further, the ionic liquid also functions as a well treatment additives, such as a clay stabilizer, shale stabilizer, salt control and/or scale inhibitor, either alone or in combination with the ionic polymer.

In addition to use for well treatment, the ionic liquid can also be used as solvents and/or as extraction aid in chemical purification. Alkyl sulfates are useful for the extraction of sulfur and nitrogen compounds from gasoline and diesel fuels. Alkyl sulfates and ionic liquids can also be used as primary additives of fabric softeners and other surface wetting agents.

Ionic Monomer

The ionic liquid may be used in the polymerization of an ionic monomer to form an ionic polymer. The ionic polymer may have one acrylamide group, a secondary alcohol group, and at least one ammonium group. Alternatively, the ionic polymer may have one secondary alcohol group, an acrylate group, and at least one ammonium group.

As noted above, the ionic liquid may function as a chain transfer agent limiting chain growth of the ionic monomer. In accordance with the present embodiments, the ionic monomer has one of the following chemical structures:

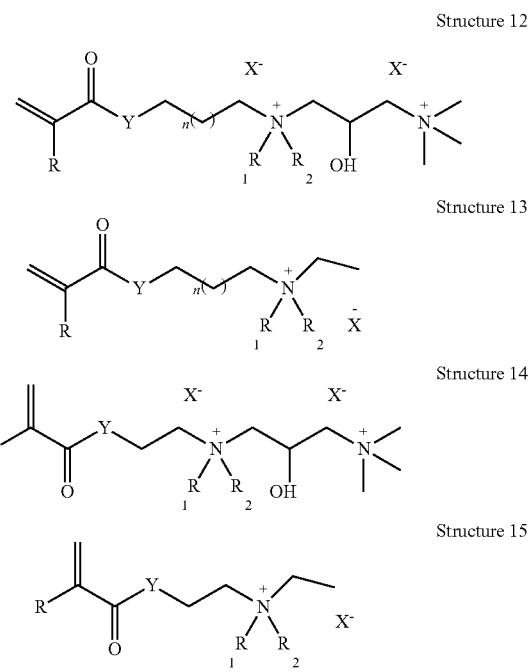

wherein Y may be an atom of oxygen or nitrogen; R may be either hydrogen or an alkyl group; $R_1$ and $R_2$ may be alkyl groups, and $X^-$ may be a counter ion which maybe one or a combination of: $F^-$, $Cl^-$, $Br^-$, $I^-$, $H_2PO_4^-$, $HPO_4^{2-}$, $PO_4^{3-}$, $HSO_4^-$, $C_7H_7OSO_3^-$, $C_7H_7SO_3^-$, $SO_4^{2-}$, $C_2H_5SO_4^-$, $CH_3SO_3^-$, $C_2H_5SO_3^-$, $C_7H_7OSO_3^-$, $C_7H_7SO_3^-$, $CH_3OSO_3^-$, $C_2H_5OSO_3^-$.

In one or more embodiments, ionic monomers suitable for use can be methacrylamide and methacrylate and their derivatives. Ionic monomers may be polymerized to form ionic polymers with improved functionality as well treatment additives. Ionic monomers may be prepared from acrylate and acrylamide monomers.

The ionic monomer can be prepared in any suitable way. In some embodiments, the ionic monomer is prepared by reaction between N,N-dimethylaminopropyl methacrylamide (DMAPMA) and (3-chloro-2-hydroxypropyl)trimethylammonium chloride:

Reaction 2

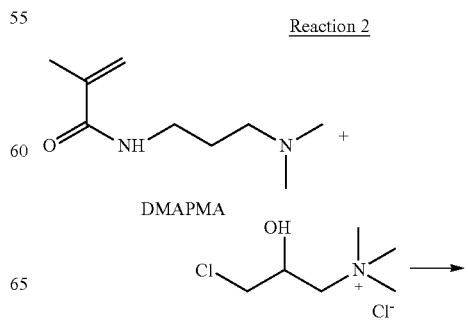

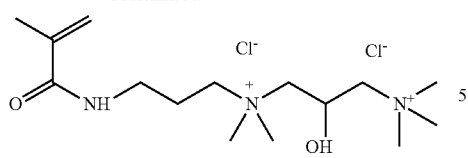

However, other methacrylamide and methacrylate monomers can be used to form the ionic polymers, such as:

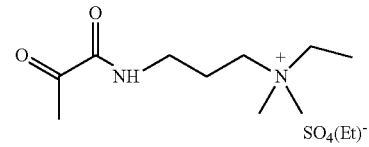

Structure 16

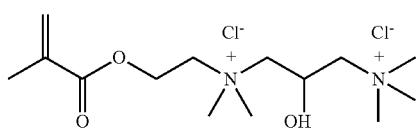

Structure 17

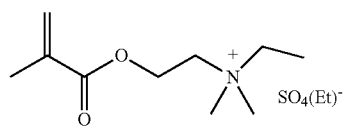

Structure 18

Ionic Liquid Polymer

In one or more embodiments, the well treatment additive further comprises an ionic liquid polymer. The ionic polymer is a liquid at standard conditions and contains at least one ionic repeating unit. The ionic liquid polymer may have the following general structure:

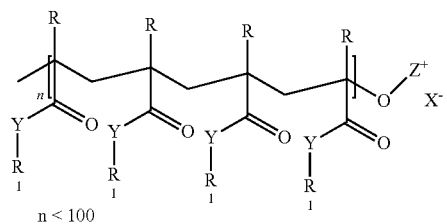

Structure 19 wherein n is <100; Y may be an atom of oxygen or nitrogen; each R may be individually selected from either hydrogen or an alkyl group; each $R_1$ may be individually selected from an alkyl group; Z is an alkyl hydroxyalkyl ammonium cation having the following formula: $[R_2R_3R_4R_5N]^+$ wherein $R_2$, $R_3$, $R_4$, $R_5$ are individually selected from the group consisting of an alkyl group, a hydroxyalkyl group, and a combination thereof; and the anion $X^-$ comprises at least one anion selected from the group consisting of $F^-$, $Cl^-$, $Br^-$, $I^-$, $H_2PO_4^-$, $HPO_4^{2-}$, $PO_4^{3-}$, $HSO_4^-$, $C_7H_7OSO_3^-$, $C_7H_7SO_3^-$, $SO_4^{2-}$, $CH_3SO_3^-$, $C_2H_5SO_3^-$, $CH_3OSO_3^-$, $C_2H_5OSO_3^-$, and combinations thereof.

An example of a suitable ionic liquid polymer is provided in the structure below:

Structure 20 wherein n is <100; Y may be an atom of oxygen or nitrogen; each R may be individually selected from either hydrogen or an alkyl group; each $R_1$ may be individually selected from an alkyl group; and the anion $X^-$ comprises at least one anion selected from the group consisting of $F^-$, $Cl^-$, $Br^-$, $I^-$, $H_2PO_4^-$, $HPO_4^{2-}$, $PO_4^{3-}$, $HSO_4^-$, $C_7H_7OSO_3^-$, $C_7H_7SO_3^-$, $SO_4^{2-}$, $CH_3SO_3^-$, $C_2H_5SO_3^-$, $CH_3OSO_3^-$, $C_2H_5OSO_3^-$, and combinations thereof. In a particular embodiment $X^-$ is $SO_4(Et)_1^-$.

Polymerization of the ionic liquid polymer can be performed using any suitable technique. In accordance with the present embodiments, the monomer and ionic liquid described above are mixed to a desired ratio using a suitable solvent, such as water, using any suitable method such as free-radical polymerization, controlled/living radical polymerization, or atoms transfer radical polymerization. It is noted that the number of monomeric units in the resultant ionic polymer is kept below 100 in the ionic polymer of reaction 3 due to the ionic liquid acting as chain growth controlling agent in accordance with one or more embodiments. An example of polymerization is illustrated in Reaction 3 below:

Reaction 3

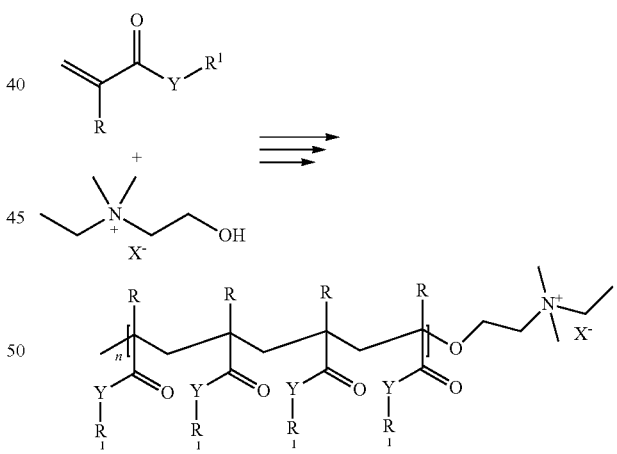

wherein n is an integer<100; Y may be an atom of oxygen or nitrogen; R may be either hydrogen or an alkyl group, each $R_1$ may individually be selected from an alkyl group, the anion $X^-$ comprises at least one anion selected from the group consisting of $F^-$, $Cl^-$, $Br^-$, $I^-$, $H_2PO_4^-$, $HPO_4^{2-}$, $PO_4^{3-}$, $HSO_4^-$, $C_7H_7OSO_3^-$, $C_7H_7SO_3^-$, $SO_4^{2-}$, $CH_3SO_3^-$, $C_2H_5SO_3^-$, $CH_3OSO_3^-$, $C_2H_5OSO_3^-$, and combinations thereof.

In one or more embodiments, the polymerization of an ionic monomer mixed with ethyl (2-hydroxyethyl) dimethylammonium ethyl sulfate as ionic liquid is illustrated in Reaction 4 below:

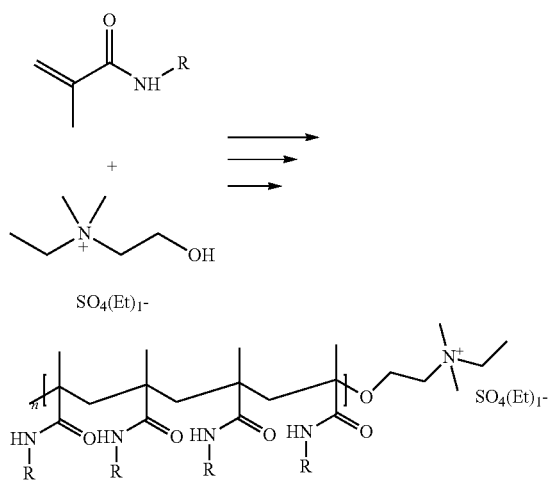

Reaction 4 wherein n<100, each R may be individually selected from either hydrogen or an alkyl group; and each $R_1$ may be individually selected from an alkyl group.

In one or more embodiments, the ionic liquid polymer is a reaction product of methacrylamide or methacrylate with the ionic liquid having the following formula: $[R_1R_2R_3R_4N]^+[X]^-$, wherein $R_1$, $R_2$, $R_3$, $R_4$ are individually selected from the group consisting of an alkyl group, a hydroxyalkyl group, and a combination thereof provided that at least one of $R_1$, $R_2$, $R_3$, $R_4$ is the hydroxyalkyl group, and wherein the anion $X^-$ comprises at least one anion selected from the group consisting of $F^-$, $Cl^-$, $Br^-$, $I^-$, $H_2PO_4^-$, $HPO_4^{2-}$, $PO_4^{3-}$, $HSO_4^-$, $C_7H_7OSO_3^-$, $C_7H_7SO_3^-$, $SO_4^{2-}$, $CH_3SO_3^-$, $C_2H_5SO_3^-$, $CH_3OSO_3^-$, $C_2H_5OSO_3^-$, and combinations thereof, as described above.

The ionic polymer then has the ionic liquid monomer active sites incorporated into the polymer matrix, and the final product has greater clay stabilization, shale stabilization, scale control, and/or salt control activity than either the ionic liquid monomer or ionic liquid polymer alone. Further, the ionic liquid also acts as well-treatment additive such as clay stabilizer, shale stabilizer, salt control, and/or scale inhibitor on its own. Therefore, the final product made up of ionic liquid polymer and the remaining ionic liquid after the polymerization reaction is more efficient than the existing products. In one or more embodiments, the efficacy of methacrylic polymers, copolymers, and terpolymers as well-treatment additive increases using the ionic liquid of the present disclosure.

The ionic polymer can have any suitable molecular weight of about 50 to about 10,000,000, about 100 to about 5,000, about 50 or less, about 100, 150, 200, 250, 300, 350, 400, 450, 500, 600, 700, 800, 900, 1,000, 1,250, 1,500, 1,750, 2,000, 2,250, 2,500, 5,000, 7,500, 10,000, 15,000, 20,000, 25,000, 30,000, 35,000, 40,000, 50,000, 75,000, 100,000, 150,000, 200,000, 250,000, 500,000, 750,000, 1,000,000, 5,000,000 or about 10,000,000 or more. In one or more embodiments, the ionic polymer has a molecular weight of about 30,000 to about 36,000.

Well Treatment Additive

In various embodiments, the present disclosure provides a composition for treatment of a subterranean formation. The composition can perform a number of functions during well treatment, including one or more clay stabilization, shale stabilization, salt control, and/or scale inhibition. In one or more embodiments, the well treatment additive comprises an ionic liquid alone or in combination with an ionic polymer, and a solvent.

The ionic liquid may have the following general formula $[R_1R_2R_3R_4N]^+[X]^-$, wherein $R_1$, $R_2$, $R_3$, $R_4$ are individually selected from the group consisting of an alkyl group, a hydroxyalkyl group, and a combination thereof provided that at least one of $R_1$, $R_2$, $R_3$, $R_4$ is the hydroxyalkyl group, and wherein the anion $X^-$ comprises at least one anion selected from the group consisting of $F^-$, $Cl^-$, $Br^-$, $I^-$, $H_2PO_4^-$, $HPO_4^{2-}$, $PO_4^{3-}$, $HSO_4^-$, $C_7H_7OSO_3^-$, $C_7H_7SO_3^-$, $SO_4^{2-}$, $CH_3SO_3^-$, $C_2H_5SO_3^-$, $CH_3OSO_3^-$, $C_2H_5OSO_3^-$, and combinations thereof. Additional details on the ionic liquid are in the section described above. The ionic liquid may be included in the well-treatment additive in any suitable amount, for example, a concentration of about 0.001 wt % to about 10 wt %, or about 0.1 wt % to about 1 wt %, or about 0.1 wt % to about 0.2 wt %.

The well-treatment additive may further comprise the ionic liquid polymer. As described above, the ionic liquid polymer includes an ionic repeating unit and is in liquid form. Additional details on the ionic liquid polymer are in the section described above. The ionic liquid polymer may be included in the well treatment additive in any suitable amount, for example, in a concentration of about 0.01 wt % to about 55 wt %, or about 0.1 wt % to about 35 wt %, or about 0.1 to about 0.6 wt %.

In one or more embodiments, the ionic liquid and ionic liquid polymer represent from about 0.01 wt % of the well treatment fluid or the entire system pumped downhole to about 50 wt %, or from about 0.025 wt % to about 1 wt %, or from about 0.1 wt % to about 0.6 wt % of the entire system.

The ionic liquid and the ionic liquid polymer may be used with a solvent. The term "solvent" as used herein refers to a liquid that can dissolve a solid, a liquid, or a gas. Non-limiting examples of solvents include water, alcohols, organic compounds, silicones, and supercritical fluids. Specific examples of solvents include methyl alcohol, ethyl alcohol, isopropyl alcohol, ethylene glycol, propylene glycol, dimethyl formamide, N-methyl pyrrolidone, propylene glycol methyl ether, and butyl CELLOSOLVE™ solvent. The solvent may be included in the well treatment additive in any suitable amount, for example, a concentration of about 20 wt % to about 90 wt % or about 60 wt % to about 85 wt %.

In addition to well treatment, a composition comprising an ionic liquid, ionic liquid polymer, and solvent as described herein as a well treatment additive, can also be used in the personal care industry as an antistatic agent and hair conditioner. They can also be used in waste treatment for laundry, emulsion breaking, and sludge dewatering. In one or more embodiments, the composition performs as an antioxidant, which in turn functions as a preservative of other chemical materials such as polyunsaturated oils.

Well Treatment Methods

The well treatment additives may be included in a treatment fluid in connection with a well treatment. The well treatment may be any activity directed to extraction of water or hydrocarbons from a subterranean petroleum or water-producing formation or region, for example, including drilling stimulation, hydraulic fracturing, clean-up, acidizing, completion, cementing, remedial treatment, abandonment, and the like. The well treatment additives may be included in a treatment fluid in an amount sufficient to provide a desired level of treatment. For example, the well treatment additive may be included in an amount of about 0.001 wt % to about 5 wt %, or about 0.01 wt % to about 1 wt %, or about 0.1 wt % to about 0.75 wt %, or about 0.1 wt % to about 0.6 wt %, or about 0.25 wt % to about 0.6 wt %. Alternatively, the well treatment additive may be included in an amount of about 0.25 gallon per thousand gallons (gpt) to about 10 gpt, or about 1 gpt to about 6 gpt.

In some embodiments, the methods include treating a subterranean formation. The method also includes placing the treatment fluid comprising a well treatment additive in a subterranean formation. The placing of the treatment fluid in the subterranean formation can include contacting the well treatment additive and any suitable part of the subterranean formation, or contacting the well treatment additive and a subterranean material, such as any suitable subterranean material. The subterranean formation can be any suitable subterranean formation.

In some examples, the placing of the treatment fluid in the subterranean formation includes contacting the treatment fluid with or placing the treatment fluid in at least one of a fracture, at least a part of an area surrounding a fracture, a flow pathway, an area surrounding a flow pathway, and an area desired to be fractured. The placing of the treatment fluid in the subterranean formation can be any suitable placing and can include any suitable contacting between the subterranean formation and the composition. The placing of the treatment fluid in the subterranean formation can include using the composition as a drilling fluid or as a cementing fluid.

The method can include hydraulic fracturing, such as a method of hydraulic fracturing to generate a fracture or flow pathway. The placing of the treatment fluid in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the treatment fluid is placed or contacted, or the treatment fluid is placed or contacted to an area surrounding the generated fracture or flow pathway.

In some embodiments, the method can be a method of drilling, stimulation, fracturing, spotting, clean-up, completion, remedial treatment, applying a pill, acidizing, cementing, packing, logging, or a combination thereof, wherein the treatment fluid can be or can include a drilling fluid, stimulation fluid, a fracturing fluid, a spotting fluid, a clean-up fluid, a completion fluid, a remedial treatment fluid, a pill, an acidization fluid, a cementing fluid, a packing fluid, or a logging fluid, respectively.

In some embodiments, the treatment fluid can include a carrier fluid. The carrier fluid can be any suitable fluid or combination of fluids, such as an aqueous fluid, an organic fluid, or an oil. The carrier fluid can be any suitable proportion of the composition, such as about 0.0001 wt % to 99.999 wt % of the composition, or about 0.01 wt % to about 99.99 wt %, about 0.1 wt % to about 99.9 wt %, or about 20 wt % to about 90 wt %, or about 50 wt % to about 99.999 wt %. The treatment fluid can be oil-based (e.g., over 50 wt % oil or organic fluids) or water-based (e.g., over 50 wt % aqueous fluids). In some embodiments, the treatment fluid can be an emulsion. The emulsion can be an aqueous-external emulsion or an oil-external emulsion. The well treatment additive can be at least partially dissolved in the water-phase of an emulsion, at least partially dissolved in an oil-phase of an emulsion, or a combination thereof.

The treatment fluid including the carrier fluid and the well treatment additive can include any suitable additional component in any suitable proportion, such that the treatment fluid, or mixture including the same, can be used as described herein.

In some embodiments, the treatment fluid is a drilling fluid. A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase.

A water-based drilling fluid in example embodiments can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in example embodiments can be any suitable oil-based drilling fluid. In various embodiments, the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

Drilling Assembly

In various embodiments, the well treatment additive disclosed herein can directly or indirectly affect one or more components or pieces of equipment associated with the preparation, delivery, recapture, recycling, reuse, and/or disposal of the disclosed composition including the well treatment additive. For example, and with reference to FIG. 1, the disclosed composition including the well treatment additives can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated in FIG. 1, the drilling assembly 100 can include a drilling platform 102 that supports a derrick 104 having a traveling block 106 for raising and lowering a drill string 108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The composition including the well treatment additives can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the composition including the well treatment additives can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the composition including the well treatment additives can be stored, reconditioned, and/or regulated until added to the drilling fluid 122.

As mentioned above, the composition including the well treatment additives can directly or indirectly affect the components and equipment of the drilling assembly 100. For example, the composition including the clay well treatment additives can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the composition including the well treatment additives.

The composition including the well treatment additives can directly or indirectly affect the pump 120, which representatively includes any conduits, pipelines, trucks, tubulars, and/or pipes used to fluidically convey the composition including the well treatment additives to the subterranean formation, any pumps, compressors, or motors (e.g., topside or downhole) used to drive the composition into motion, any valves or related joints used to regulate the pressure or flow rate of the composition, and any sensors (e.g., pressure, temperature, flow rate, and the like), gauges, and/or combinations thereof, and the like. The composition including the well treatment additives can also directly or indirectly affect the mixing hopper 134 and the retention pit 132 and their assorted variations.

The composition including the well treatment additives can also directly or indirectly affect the various downhole or subterranean equipment and tools that can come into contact with the composition including the well treatment additives such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition including the well treatment additives can also directly or indirectly affect any downhole heat exchangers, valves and corresponding actuation devices, tool seals, packers and other wellbore isolation devices or components, and the like associated with the wellbore 116. The composition including the well treatment additives can also directly or indirectly affect the drill bit 114, which can include roller cone bits, polycrystalline diamond compact (PDC) bits, natural diamond bits, any hole openers, reamers, coring bits, and the like.

While not specifically illustrated herein, the composition including the well treatment additives can also directly or indirectly affect any transport or delivery equipment used to convey the composition including the well treatment additives to the drilling assembly 100 such as, for example, any transport vessels, conduits, pipelines, trucks, tubulars, and/or pipes used to fluidically move the composition including the well treatment additives from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

Delivery System and Apparatus

Figure 2:
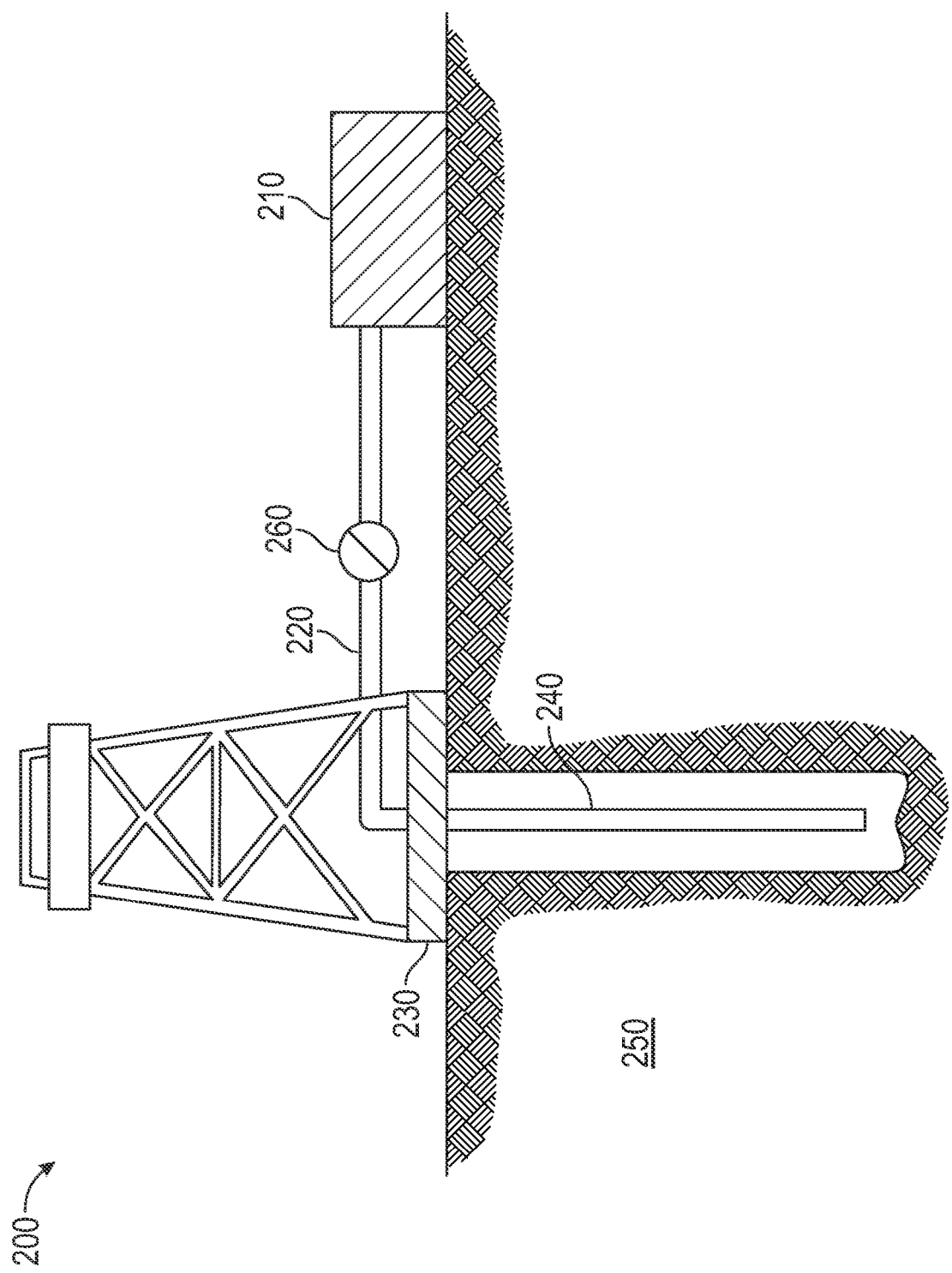
FIG. 2 illustrates a system or apparatus for delivering a composition to a subterranean formation, in accordance with various embodiments of the present disclosure.

FIG. 2 shows an illustrative schematic of systems and apparatuses that can deliver embodiments of the compositions to a subterranean location, according to one or more embodiments. It should be noted that while FIG. 2 generally depicts a land-based system or apparatus, it is to be recognized that like systems and apparatuses can be operated in subsea locations as well. Embodiments can have a different scale than that depicted in FIG. 2. As depicted in FIG. 2, system or apparatus 200 can include mixing tank 210, in which an embodiment of the composition can be formulated. The composition can be conveyed via line 220 to wellhead 230, where the composition enters tubular 240, with tubular 240 extending from wellhead 230 into subterranean formation 250. Upon being ejected from tubular 240, the composition can subsequently penetrate subterranean formation 250. Pump 260 can be configured to raise the pressure of the composition to a desired degree before its introduction into tubular 240. It is to be recognized that system or apparatus 200 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 230 and exit subterranean formation 250. The composition that flows back can be substantially diminished in the concentration of the well treatment additives or can have none of the well treatment additives therein. In some embodiments, the composition that has flowed back to wellhead 230 can subsequently be recovered, and in some examples reformulated, and recirculated to subterranean formation 250.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Accordingly, the present disclosure may provide well treatment additives comprising an ionic liquid. In one or more embodiments, the ionic liquid is dual functional for well treatment and as a chain transfer agent to limit molecular weight during polymerization of ionic monomers. For example, the ionic liquid can be used during polymerization of ionic monomers to limit the molecular weight of the ionic polymer. In addition, the ionic liquid enhances the ionic polymer ability to perform as a well treatment additive. In one or more embodiments, the well treatment additive may act as a clay stabilizer, shale stabilizer, salt control, and/or scale inhibitor. Finally, the ionic liquid acts as well treatment additive on its own. In some embodiments, a well treatment additive comprises an ionic liquid, an ionic polymer, and a solvent.

The methods and compositions may include any of the various features disclosed herein, including one or more of the following statements.

Statement 1. A method of treating a subterranean formation, comprising: contacting the subterranean formation with a well treatment additive, wherein the well treatment additive comprises an ionic liquid comprising a cation and an anion having the following formula: $[R_1R_2R_3R_4N]^+[X]^-$, wherein $R_1$, $R_2$, $R_3$, $R_4$ are individually selected from the group consisting of an alkyl group, a hydroxyalkyl group, and a combination thereof provided that at least one of $R_1$, $R_2$, $R_3$, $R_4$ is the hydroxyalkyl group, and wherein the anion $X^-$ comprises at least one anion selected from the group consisting of $F^-$, $Cl^-$, $Br^-$, $I^-$, $H_2PO_4^-$, $HPO_4^{2-}$, $PO_4^{3-}$, $HSO_4^-$, $C_7H_7OSO_3^-$, $C_7H_7SO_3^-$, $SO_4^{2-}$, $CH_3SO_3^-$, $C_2H_5SO_3^-$, $CH_3OSO_3^-$, $C_2H_5OSO_3^-$, and combinations thereof.

Statement 2. The method of Statement 1, wherein the ionic liquid is a hydroxyalkyl ammonium sulfate.

Statement 3. The method of Statement 1 or 2, wherein the ionic liquid is ethyl (2-hydroxyethyl) dimethylammonium ethyl sulfate.

Statement 4. The method of any preceding Statement, wherein the well treatment additive further comprises an ionic liquid polymer that is a reaction product of methacrylate and a chain transfer agent comprising a cation and an anion having the following formula: $[R_1R_2R_3R_4N]^+[X]^-$, wherein $R_1$, $R_2$, $R_3$, $R_4$ are individually selected from the group consisting of an alkyl group, a hydroxyalkyl group, and a combination thereof provided that at least one of $R_1$, $R_2$, $R_3$, $R_4$ is the hydroxyalkyl group, and wherein the anion $X^-$ comprises at least one anion selected from the group consisting of $F^-$, $Cl^-$, $Br^-$, $I^-$, $H_2PO_4^-$, $HPO_4^{2-}$, $PO_4^{3-}$, $HSO_4^-$, $C_7H_7OSO_3^-$, $C_7H_7SO_3^-$, $SO_4^{2-}$, $CH_3SO_3^-$, $C_2H_5SO_3^-$, $CH_3OSO_3^-$, $C_2H_5OSO_3^-$, and combinations thereof.

Statement 5. The method of any preceding Statement, wherein the well treatment additive further comprises an ionic liquid polymer that is a reaction product of methacrylamide and a chain transfer agent comprising a cation and an anion having the following formula: $[R_1R_2R_3R_4N]^+[X]^-$, wherein $R_1$, $R_2$, $R_3$, $R_4$ are individually selected from the group consisting of an alkyl group, a hydroxyalkyl group, and a combination thereof provided that at least one of $R_1$, $R_2$, $R_3$, $R_4$ is the hydroxyalkyl group, and wherein the anion $X^-$ comprises at least one anion selected from the group consisting of $F^-$, $Cl^-$, $Br^-$, $I^-$, $H_2PO_4^-$, $HPO_4^{2-}$, $PO_4^{3-}$, $HSO_4^-$, $C_7H_7OSO_3^-$, $C_7H_7SO_3^-$, $SO_4^{2-}$, $CH_3SO_3^-$, $C_2H_5SO_3^-$, $CH_3OSO_3^-$, $C_2H_5OSO_3^-$, and combinations thereof.

Statement 6. The method of any preceding Statement, wherein the well treatment additive further comprises an ionic liquid polymer that is a reaction product of methacrylamide and ethyl (2-hydroxyethyl) dimethylammonium ethyl sulfate.

Statement 7. The method of any preceding Statement, wherein the well treatment additive stabilizes clay in the subterranean formation.

Statement 8. The method of any preceding Statement, further comprising introducing a treatment fluid comprising the well treatment additive into a wellbore to contact the subterranean formation.

Statement 9: The method of any preceding Statement, wherein the well treatment additive is present in the treatment fluid in an amount of about 0.1 wt % to about 0.6 wt % of the treatment fluid.

Statement 10: The method of Statement 9, wherein the well treatment additive comprises the ionic liquid in an amount of about 0.01 wt % to about 0.6 wt % by weight of the well treatment additive, the ionic liquid polymer in an amount of about 0.1 wt % to about 0.6 wt % by weight of the well treatment additive, and a solvent in an amount of about 1 wt % to about 99 wt % by weight of the well treatment additive.

Statement 11: A method of treating a subterranean formation, comprising: contacting the subterranean formation with a well treatment additive, wherein the well treatment additive comprises ethyl (2-hydroxyethyl) dimethylammonium ethyl sulfate in an amount of 0.01 wt % to 0.6 wt %, an ionic polymer in an amount of 0.1 wt % to 0.6 wt %, wherein the ionic polymer is the product of the ethyl (2-hydroxyethyl) dimethylammonium ethyl sulfate with a methacrylamide monomer, and a solvent.

Statement 12: A well treatment fluid comprising: a base fluid; and a well treatment additive comprising an ionic liquid comprising a cation and an anion having the following formula: $[R_1R_2R_3R_4N]^+[X]^-$, wherein $R_1$, $R_2$, $R_3$, $R_4$ are individually selected from the group consisting of an alkyl group, a hydroxyalkyl group, and a combination thereof provided that at least one of $R_1$, $R_2$, $R_3$, $R_4$ is the hydroxyalkyl group, and wherein the anion $X^-$ comprises at least one anion selected from the group consisting of $F^-$, $Cl^-$, $Br^-$, $I^-$, $H_2PO_4^-$, $HPO_4^{2-}$, $PO_4^{3-}$, $HSO_4^-$, $C_7H_7OSO_3^-$, $C_7H_7SO_3^-$, $SO_4^{2-}$, $CH_3SO_3^-$, $C_2H_5SO_3^-$, $CH_3OSO_3^-$, $C_2H_5OSO_3^-$, and combinations thereof.

Statement 13: The well treatment of Statement 12, wherein the ionic liquid is a hydroxyalkyl ammonium sulfate.

Statement 14: The well treatment of any of Statements 12-13, wherein the ionic liquid is ethyl (2-hydroxyethyl) dimethylammonium ethyl sulfate.

Statement 15: The well treatment of any of Statements 12-14, wherein the well treatment additive further comprises an ionic liquid polymer that is a reaction product of methacrylate and a chain transfer agent comprising a cation and an anion having the following formula: $[R_1R_2R_3R_4N]^+[X]^-$, wherein $R_1$, $R_2$, $R_3$, $R_4$ are individually selected from the group consisting of an alkyl group, a hydroxyalkyl group, and a combination thereof provided that at least one of $R_1$, $R_2$, $R_3$, $R_4$ is the hydroxyalkyl group, and wherein the anion $X^-$ comprises at least one anion selected from the group consisting of $F^-$, $Cl^-$, $Br^-$, $I^-$, $H_2PO_4^-$, $HPO_4^{2-}$, $PO_4^{3-}$, $HSO_4^-$, $C_7H_7OSO_3^-$, $C_7H_7SO_3^-$, $SO_4^{2-}$, $CH_3SO_3^-$, $C_2H_5SO_3^-$, $CH_3OSO_3^-$, $C_2H_5OSO_3^-$, and combinations thereof.

Statement 16: The well treatment of any of Statements 12-15, wherein the well treatment additive further comprises an ionic liquid polymer that is a reaction product of methacrylamide and a chain transfer agent comprising a cation and anion having the following formula: $[R_1R_2R_3R_4N]^+[X]^-$, wherein $R_1$, $R_2$, $R_3$, $R_4$ are individually selected from the group consisting of an alkyl group, a hydroxyalkyl group, and a combination thereof provided that at least one of $R_1$, $R_2$, $R_3$, $R_4$ is the hydroxyalkyl group, and wherein the anion $X^-$ comprises at least one anion selected from the group consisting of $F^-$, $Cl^-$, $Br^-$, $I^-$, $H_2PO_4^-$, $HPO_4^{2-}$, $PO_4^{3-}$, $HSO_4^-$, $C_7H_7OSO_3^-$, $C_7H_7SO_3^-$, $SO_4^{2-}$, $CH_3SO_3^-$, $C_2H_5SO_3^-$, $CH_3OSO_3^-$, $C_2H_5OSO_3^-$, and combinations thereof.

Statement 17: The well treatment of any of Statements 12-16, wherein the well treatment additive further comprises an ionic liquid polymer that is a reaction product of methacrylamide and ethyl (2-hydroxyethyl) dimethylammonium ethyl sulfate.

Statement 18: The well treatment of any of Statements 12-17, wherein the well treatment additive is present in the treatment fluid in an amount of about 0.1 wt % to about 0.6 wt % of the treatment fluid.

Statement 19: The well treatment of any of Statements 12-18, wherein the well treatment additive comprises the ionic liquid in an amount of about 0.01 wt % to about 0.6 wt % of the well treatment additive, the ionic liquid polymer in an amount of about 0.1 wt % to about 0.6 wt % of the well treatment additive, and a solvent in an amount of about 1 wt % to about 99 wt % of the well treatment additive.

Statement 20: The well treatment fluid of Statements 12-19, wherein the well treatment additive comprises ethyl (2-hydroxyethyl) dimethylammonium ethyl sulfate in an amount of 0.01 wt % to 0.6 wt %, an ionic polymer in an amount of 0.1 wt % to 0.6 wt %, wherein the ionic polymer is the product of the ethyl (2-hydroxyethyl) dimethylammonium ethyl sulfate with a methacrylamide monomer, and a solvent.

To facilitate a better understanding of the disclosure, the following examples of certain aspects of some embodiments are given. In no way should the following examples be read to limit, or define, the entire scope of the disclosure.

EXAMPLES

General Synthesis of Ionic Liquid

Diethyl sulfate (DES, 290.6 g, 1.88 mol) was added to a 500 mL round bottom flask equipped with a temperature probe and an overhead mechanical mixer. The reaction flask was submerged into an ice bath, and an additional funnel containing dimethyl ethanolamine (DMEA, 160.1 g, 1.79 mol) was affixed to the reaction flask. With rapid stirring the DMEA was added dropwise to the chilled DES over the course of an hour. After the DMEA was added, the reaction was allowed to warm to room temperature and stirred overnight to yield 450.6 g of a clear and colorless product. The product was titrated for amine value and an Attenuated Total Reflection-Fourier Transform Infrared (ATR-FTIR) was collected. The reaction was considered complete when the amine value was <1.0 mgKOH/g and the —NH— stretch (~3100 cm$^{-1}$) in the ATR-FTIR spectrum was depleted.

General Synthesis of Ionic Monomer

To prepare the ionic monomers used herein the same general procedure described for the ionic liquid above was used. Water (18.38 g) was added to (3-Chloro-2-hydroxypropyl) trimethylammonium chloride (65% solution in water, 300.4 g, 1.04 mol). With rapid mixing dimethylaminopropyl methacrylamide (DMAPMA, 175.0 g, 1.03 mol) was added dropwise via addition funnel to the reaction flask. While mixing the reaction was allowed to warm to room temperature to produce a clear, colorless product. The monomer was approximately 75% active content in water.

General Polymerization of Ionic Monomer with the Ionic Liquid

To prepare the ionic liquid polymer, 50 g of ionic monomer (e.g., monomer A, Structure 12 above with n=1), water (25 g), IL (0-40 g), and iron (III) chloride polymerization catalyst (5.16-51.6 g) were mixed in a round bottom flask equipped with a temperature probe and overhead mixer. The solution was sparged with dry nitrogen for 30 minutes. In a separate vessel from 1.25 g to 12.5 g of sodium bisulfite (SBS) was dissolved in a minimal amount of water and sparged for 5 minutes. Under an atmosphere of nitrogen, the polymerization was initiated by injecting the sodium bisulfite solution into the reaction flask. The solution was allowed to react for the desired amount of time, followed by termination of the reaction by heating the flask to 100° C. for 30-60 minutes. The product was a clear, colorless, and viscous solution. The viscosity of the ionic polymer at 50% concentration is 1,100 cP at 25° C.

Example Showing Use of Ionic Liquid for Clay Control

Figure 3:
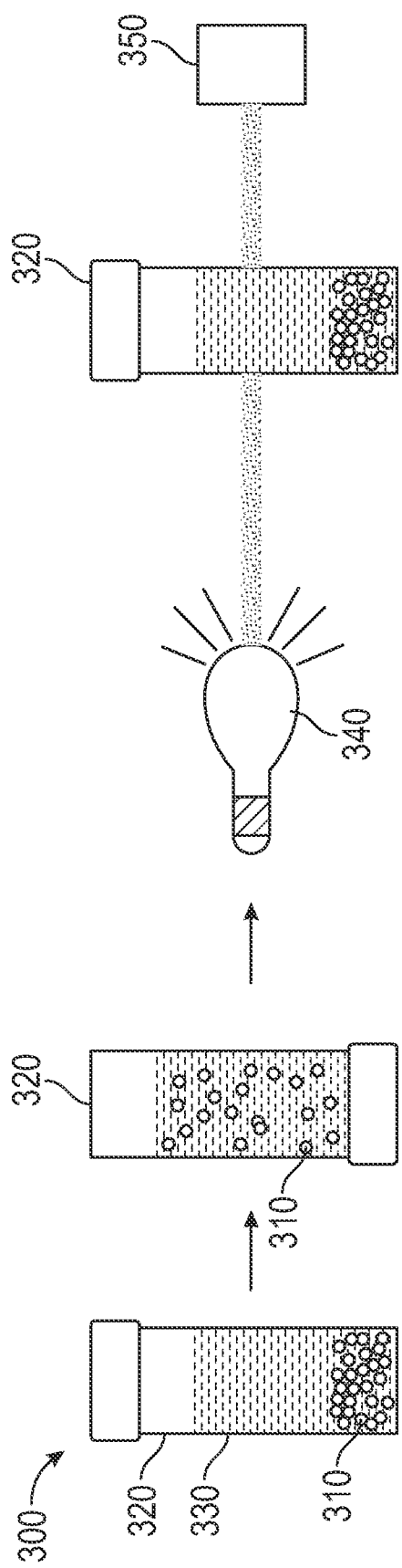
FIG. 3 illustrates a mechanical stability turbidity test in certain embodiments of the present disclosure.

A Mechanical Stability Turbidity (MST) test was used to evaluate the use of the ionic liquid and/or ionic liquid polymer for clay control. Formation stability may be measured by the MST test, which measures damage to the formation materials caused by a fluid, including but not limited to softening, fines migration and sloughing. The propensity of the sample to disintegrate and release suspended fine materials is determined by measuring the turbidity of the solution. FIG. 3 illustrates a process 300 for an MST used in this Example, which entails at step (A) the placement of formation cuttings 310 into a vial 320 containing a treatment fluid 330 and then rotating the vial during step (B) to impart mechanical agitation. This procedure exposes the formation cuttings 310 to a number of forces, including but not limited to particle-to-particle collisions, particle-to-wall shear forces, particle-to-wall impact forces, and/or particle-to-fluid drag forces. In step (C), turbidity measurements are then obtained to quantify the fine materials suspended in a fluid at various time points in the process, as a function of the amount of light from a light source 340 that passes through the vial 320 to a detector 350 on the opposite side of the vial. Higher turbidities indicate more fluid induced destabilization of the formation materials. Lower turbidity is indicative of an effective formation stabilization treatment.

During the MST test, separation of damage and undamaged samples occurs and the settling rate in the fluid is used, which is proportional to particle size of the particles and their density difference of the fluid. Initial particle size of the materials used in testing may be chosen to help ensure that the undamaged materials will settle out of the sample, leaving only the generated fines suspended in solution for each reading. In some embodiments, the instrument may take an average of 6 seconds to take a measurement and, within that time, only material of ~5 microns or less may be captured in the reading (~1.3% of the starting size and much larger than a single clay platelet). A potential source of error in some sample flocculation or precipitation of the test materials causes the fines to behave as larger particles and not suspend, which can lead to compromised turbidity measurements. However, the results obtained with the MST may have less than 5% variability and correlate well with the Brinell hardness of materials.

Figure 4:
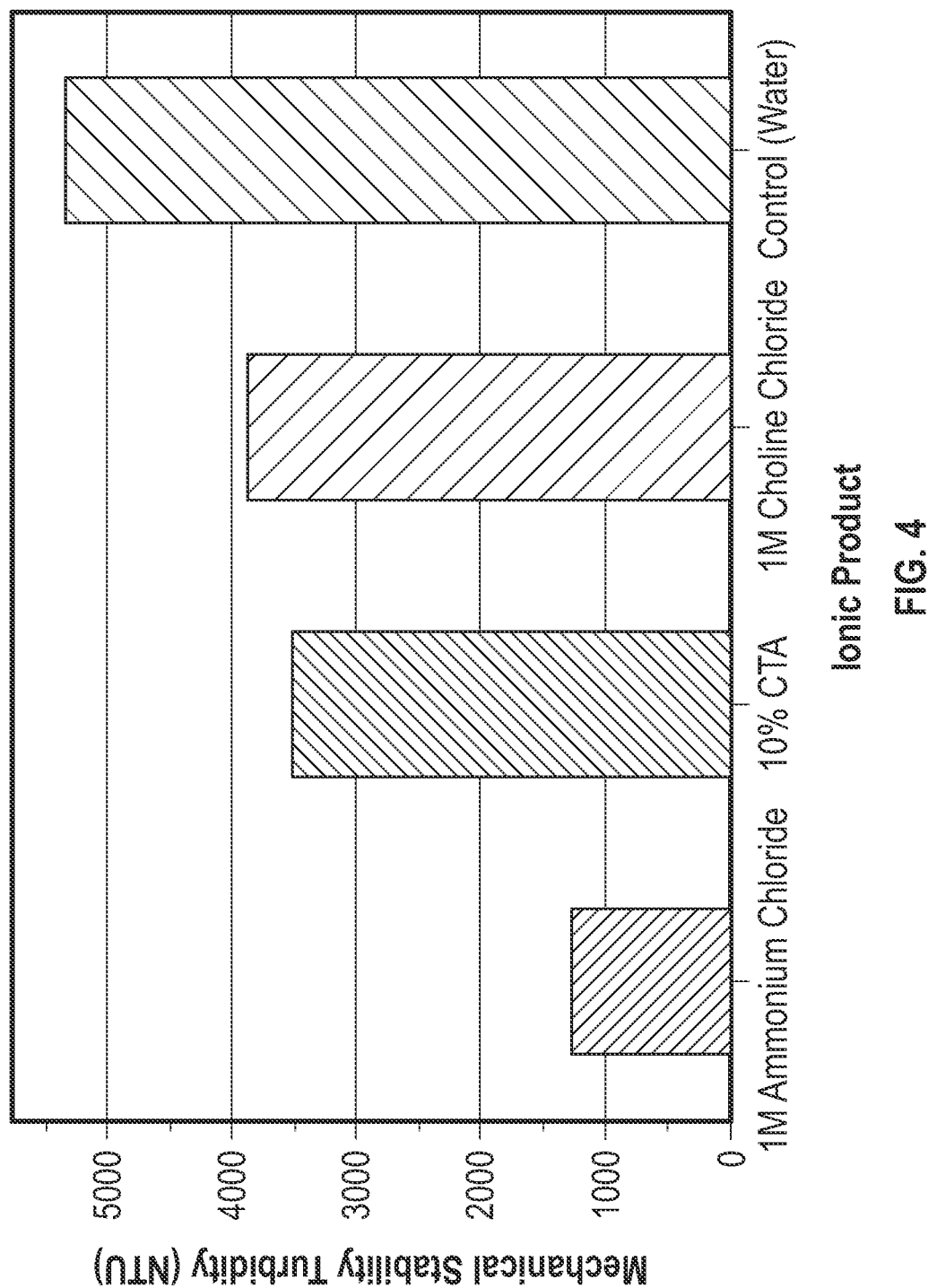
FIG. 4 shows the results of the mechanical stability turbidity test comparing an embodiment of a chain transfer agent of the present disclosure to a traditional ionic clay stabilizer.

FIG. 4 shows the results of the MST test comparing one of the embodiments of an ionic liquid chain transfer agent (CTA) to a couple of traditional ionic clay stabilizers. The ionic liquid of one of the embodiments of the present disclosure is (3-chloro-2-hydroxypropyl) trimethylammonium chloride labeled CTA in FIG. 4 at 10 wt % without any polymer or extra ions. Each ionic solution of FIG. 4 (1 M Ammonium Chloride, 10% CTA, 1 M Choline Chloride) was made in fresh water, or water free from extra ions.

This MST test measures the release of formation material due to fluid induced clay damage. Ground formation materials were subjected to a freshwater control or treatment fluid and subjected to mechanical agitation. During a short period of time, the propensity of the sample to disintegrate and release suspended fine materials is determined by measuring the turbidity of the solution. More fines in suspension are an indication that the fluid wetting and mechanical agitation process resulted in an increase in the rate of formation destabilization. The turbidity of the fluid is monitored as a function of aggregation time and treatment—the treatment that generates the lowest turbidity is indicative of the optimum formation stabilization treatment. Example comparing clay control additive of ionic liquids (ammonium chloride and choline chloride), the ionic chain transfer agent (10% CTA), and the control shows that the CTA is similar in performance to Choline Chloride, but less protective than a 1M solution of ammonium chloride.

Example Comparing Clay Control Additive of Ionic Liquid and Polymer with a Similar Polymeric Clay Control Additive without the Ionic Liquid.

Figure 5:
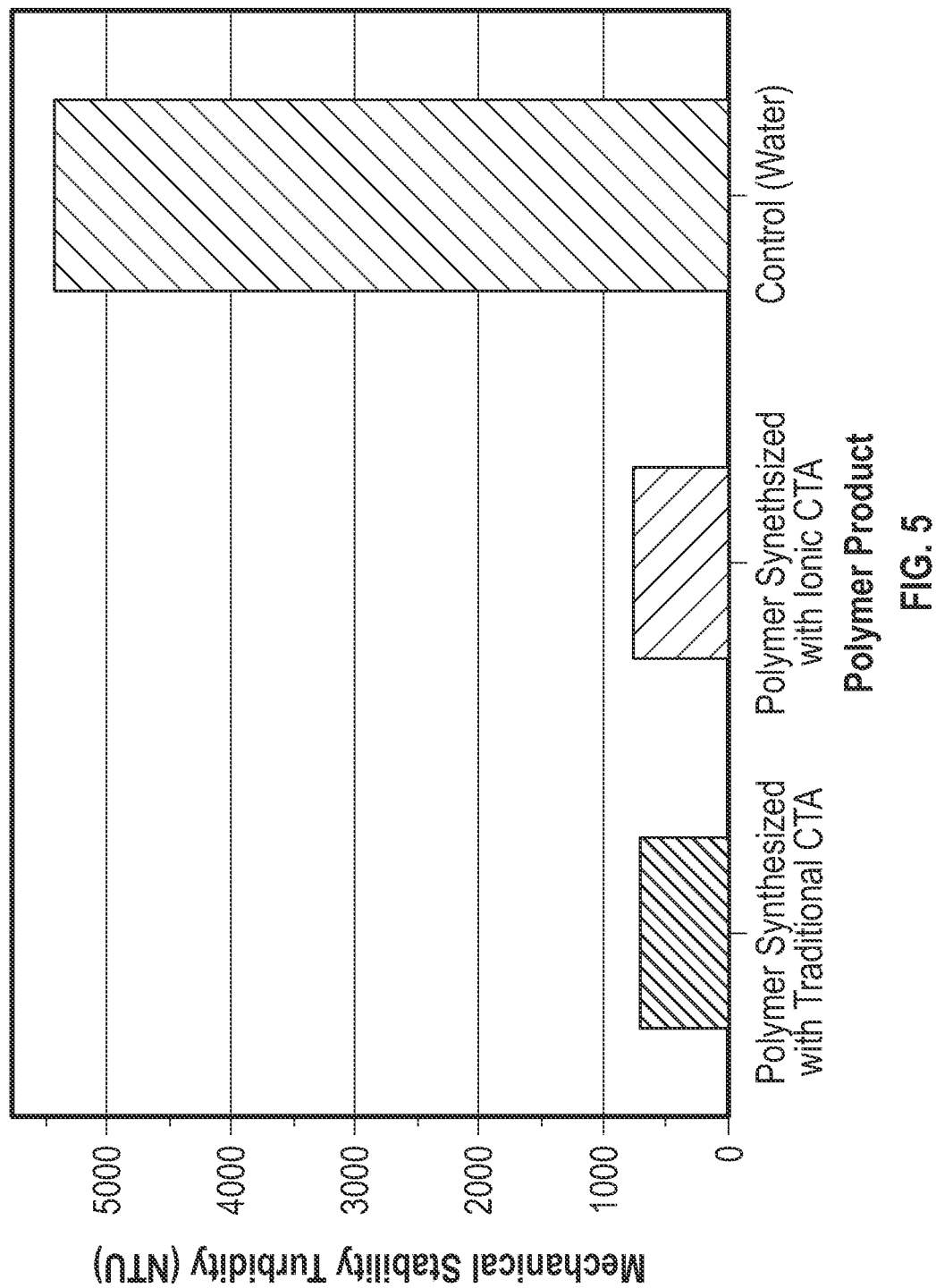
FIG. 5 shows a comparison between clay control additive of traditional polymer and a new polymer synthesized with an embodiment of an ionic chain transfer agent of the present disclosure.

FIG. 5 shows a comparison between clay control additive of polymer synthesized with traditional CTA, a similar polymer synthesized with the ionic chain transfer agent of one of the embodiments of the present disclosure, and the control shows the polymers are similar in performance. The comparative clay control additive was a traditional, commercially available, large molecular weight polymer clay stabilizer (poly(2-hydroxy-N1-(3-methacrylamidopropyl)-N1,N1,N3,N3,N3-pentamethylpropane-1,3-diaminium).

The ionic liquid polymer prepared from monomer A, Structure 12 above was synthesized using (3-chloro-2-hydroxypropyl)trimethylammonium chloride as the CTA and run at a concentration of 0.1 wt % in fresh water.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Further-more, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method of treating a subterranean formation, comprising:
    contacting the subterranean formation with a well treatment additive,
        wherein the well treatment additive comprises:
            an ionic liquid consisting of a cation and an anion having the following formula: $[R_1R_2R_3R_4N]^+ [X]^-$,
                wherein $R_1$, $R_2$, $R_3$, and $R_4$ are individually selected from the group consisting of an alkyl group, a hydroxyalkyl group, and a combination thereof provided that at least one of $R_1$, $R_2$, $R_3$, or $R_4$ is the hydroxyalkyl group, and
                wherein the anion $X^-$ consists of $C_2H_5OSO_3^-$, and
            an ionic liquid polymer that is a reaction product of methacrylamide and the ionic liquid,
                wherein the ionic liquid acts as a chain transfer agent and controls a molecular weight of the ionic liquid polymer, wherein the ionic liquid polymer has a molecular weight in a range of 25,000 to 50,000,
        wherein the ionic liquid that is remaining after formation of the reaction product and not in the ionic liquid polymer is present in an amount of about 1 wt % to about 10 wt % of the well treatment additive;
        wherein the ionic liquid polymer is present in an amount from about 0.1 wt % to about 55 wt %; and
        wherein the well treatment additive is present in a treatment fluid of the subterranean formation in an amount of about 0.1 wt % to about 0.6 wt % of the treatment fluid.

2. The method of claim 1, wherein the ionic liquid is a hydroxyalkyl ammonium sulfate.

3. The method of claim 1, wherein the ionic liquid is ethyl (2-hydroxyethyl) dimethylammonium ethyl sulfate.

4. The method of claim 1, wherein the ionic liquid polymer is a reaction product of methacrylamide and ethyl (2-hydroxyethyl) dimethylammonium ethyl sulfate.

5. The method of claim 1, wherein the well treatment additive stabilizes clay in the subterranean formation.

6. The method of claim 1, further comprising introducing a treatment fluid comprising the well treatment additive into a wellbore to contact the subterranean formation.

7. The method of claim 1, wherein the well treatment additive comprises a solvent in an amount of about 1 wt % to about 99 wt % by weight of the well treatment additive.

* * * * *